(12) United States Patent
Stein

(10) Patent No.: US 9,068,337 B2
(45) Date of Patent: Jun. 30, 2015

(54) FLUID STREAM HYDRODYNAMIC SEPARATOR WITH HIGH FLOW BYPASS

(75) Inventor: Walter G. Stein, Moorpark, CA (US)

(73) Assignee: WDD ENGINEERING, LLC, Simi Valley, CA (US)

( * ) Notice: Subject to any disclaimer, the term of this patent is extended or adjusted under 35 U.S.C. 154(b) by 235 days.

(21) Appl. No.: 13/587,820

(22) Filed: Aug. 16, 2012

(65) Prior Publication Data

US 2013/0206661 A1 Aug. 15, 2013

Related U.S. Application Data

(60) Provisional application No. 61/525,650, filed on Aug. 19, 2011.

(51) Int. Cl.
| | |
|---|---|
| E03F 5/14 | (2006.01) |
| E03F 5/04 | (2006.01) |
| B01D 36/04 | (2006.01) |
| C02F 103/00 | (2006.01) |

(52) U.S. Cl.
CPC ............... *E03F 5/14* (2013.01); *B01D 2221/12* (2013.01); *E03F 5/0403* (2013.01); *B01D 36/04* (2013.01); *E03F 5/0404* (2013.01); *C02F 2103/001* (2013.01)

(58) Field of Classification Search
CPC ....... E03F 5/0403; E03F 5/0404; E03F 5/105; E03F 5/14; E03F 5/16; B01D 21/2411; B01D 36/04; B01D 36/045; B01D 2201/48; B01D 2221/12; C02F 2103/001
USPC ............ 210/170.03, 254, 256, 299, 304, 434, 210/512.1, 519, 532.1
See application file for complete search history.

(56) References Cited

U.S. PATENT DOCUMENTS

| | | | | |
|---|---|---|---|---|
| 5,814,216 A | * | 9/1998 | Filion | 210/304 |
| 6,241,882 B1 | * | 6/2001 | Allard | 210/170.03 |

(Continued)

FOREIGN PATENT DOCUMENTS

| | | |
|---|---|---|
| DE | 10136161 A1 | 2/2003 |
| EP | 0565921 A2 | 10/1993 |

OTHER PUBLICATIONS

Machine translation of DE 10136161, Jul. 2001.*
Written Opinion and Search Report of International Application No. PCT/US2012/051223 mailed Oct. 25, 2012.

*Primary Examiner* — Christopher Upton
(74) *Attorney, Agent, or Firm* — Koppel, Patrick, Heybl & Philpott; Michael J. Ram

(57) ABSTRACT

A system for separating waste materials from a flowing stream of surface water comprises a vertical cylindrical vessel and a vertical structure within the cylindrical vessel. The vertical structure comprises stacked filtering elements and weirs sized to accommodate normal and increased fluid flow for abnormally high surface water flow conditions. The flowing stream containing waste material under normal flow conditions enters the vessel and passes through a filtering wall portion in a lower section of the vertical structure and exits through and effluent pipe. Under higher flow conditions the water flows through an overflow structure mounted on top of a lower cylindrical structure The over flow structure comprises one or more upwardly extending filtering structures and weirs sized to accommodate the excess flow conditions, filter at least a portion of the waste material from said excess flow and direct such excess flow to the effluent pipe.

9 Claims, 5 Drawing Sheets

(56) References Cited

U.S. PATENT DOCUMENTS

| | | | |
|---|---|---|---|
| 6,547,962 B2 * | 4/2003 | Kistner et al. | 210/170.03 |
| 7,108,783 B2 * | 9/2006 | Glazik | 210/170.03 |
| 7,465,391 B2 * | 12/2008 | Heist et al. | 210/512.1 |
| 7,540,954 B2 * | 6/2009 | An et al. | 210/170.03 |
| 7,632,416 B2 * | 12/2009 | Levitt | 210/304 |
| 2008/0073258 A1 * | 3/2008 | Su et al. | 210/170.03 |
| 2009/0166278 A1 | 7/2009 | Bryant | |
| 2010/0243553 A1 * | 9/2010 | Vuilliomenet | 210/435 |

\* cited by examiner

US 9,068,337 B2

FLUID STREAM HYDRODYNAMIC SEPARATOR WITH HIGH FLOW BYPASS

This application claims benefit of U.S. Provisional Application 61/525,650 filed Aug. 19, 2011.

FIELD OF INVENTION

The present invention relates to a hydrodynamic separator unit designed to separate solid matter from a surface water fluid stream flowing into and through the unit in both normal and abnormally high fluid flow conditions.

BACKGROUND

One example of a prior art hydrodynamic separator is shown in U.S. Pat. No. 5,788,848 patent. This patent shows a system comprising inner and an outer non-concentric cylinders, the inner cylinder including a screen portion (the screened separator). The debris containing stream is feed to the internal space within the inner cylindrical screened separator; the material contained therein is retained within and below the inner cylinder while the fluid flows from the inside of the inner screened cylinder to an annular space between the inner and outer cylinder and exits from the surrounding outer chamber.

U.S. Pat. No. 6,241,881 discloses a similar cylindrical waste separator which includes on its upper portion an inlet for loaded influent and an outlet for cleaned effluent. The separator comprises a cylindrical portion having a lower part incorporating a basket. The inflow stream containing solid matter flows in a rotary motion to the area inside the cylindrical portion above the basket. The solid matter of a size greater than that of the mesh openings in the basket are retained within the cylinder and in the basket at the lower end of the cylinder and the fluid with solid matter smaller than the mesh openings, referred to as cleaned effluent, passes outward through the basket and cylinder walls. Cleaned effluent entering the peripheral area surrounding the basket and cylinder then flows upwards into the outlet pipe.

These arrangement have the disadvantage of clogging as a result of retained waste material, such as plastic bags, bottles, leaves, etc, that can accumulate against the inner walls of the screen causing the swirling, inflowing stream to penetrate the only the upper portion of the screen which, in turn, causes the inflowing stream to flow only through the upper portion of the basket. Bulky waste obstructing the basket walls thus reduces the flow capacity of liquid passing through the basket and the efficiency of separation and the inflowing stream tends to bypass the separator and flow directly to the outlet through an overflow weir.

U.S. Pat. No. 6,641,720, shows a separator which has a plurality of protruding segments adjacent openings in the panel, with each segment extending from the face of the panel at a position upstream of respective openings so as to project into the fluid flow path to form a substantially closed face to the liquid flowing over the screen, the intent being to prevent blockage of the openings in the screen.

An alternative hydrodynamic separator for urban and industrial effluents, shown in EP Published application 2,181,748, incorporated herein in its entirety by reference, includes a tank having a centrally located cylindrical chamber, the cylindrical chamber having a tubular screen made of expanded or perforated metal within the space defined by the cylindrical chamber. In these separators, fluid flowing into the separator circulates in the tank in a space exterior to the cylindrical chamber. Waste is constrained in a cyclone-like vortex that forms in the tank but outside the screened cylinder and moves downwards to the bottom of the tank while cleaned fluid flows through the lateral surface of an expanded metal screen of the cylinder and exits from the bottom of the centrally located screened chamber.

The rotation of the effluent stream in the periphery helps avoid the deposition of waste or particles on the screen so that the screen remains unobstructed.

SUMMARY

A unit for separating particulate matter and solid waste, particularly large sized particles in a flowing stream of surface water includes a cylindrical filter structure onto which the effluent stream flows. The filter structure separates solid wastes of specific dimensions which cannot pass through the filter structure from the cleaned stream which flows through the filter to a downstream outlet chamber from which the effluent stream cleaned from the retained solid waste is discharged. Solid waste particles smaller in size than the apertures of the screen cylinder may also be captured through swirl concentration, vortex separation and particle sedimentation processes inherent under flow conditions. The filter structure consists of a screen, which is designed to be traversed by the flowing stream, an inlet chamber and an outlet chamber, which are both contained in a tank. Solid waste of large dimensions, which cannot pass through the filter structure, is collected at the bottom of the inlet chamber. The separator unit further includes structure on the top thereof designed to redirect excess fluid flow that exceeds the design capacity of the separator. This internal bypass structure is, comprised of a combination of additional filter structures and weirs, to filter and direct the bypass of very large flows that exceed the design capacity of the primary filter screen cylinder. This bypass structure provides screening treatment of the large bypass flows and baffling retention of floating solids.

DETAILED DESCRIPTION

Described and shown herein is a hydrodynamic separator for separating solid matter from a stream of liquid surface water such as urban and industrial storm water runoff containing waste material. Such a structure is typically used to separate debris in an inflowing stream before a finer treatment process can be applied to the flowing stream. The separator 10, shown in FIGS. 3-6 includes an upper extension 12, referred to herein as the Quad Bypass Tower. This construction is an improvement over the prior art structures such as shown in FIGS. 1 and 2.

Figure 1:
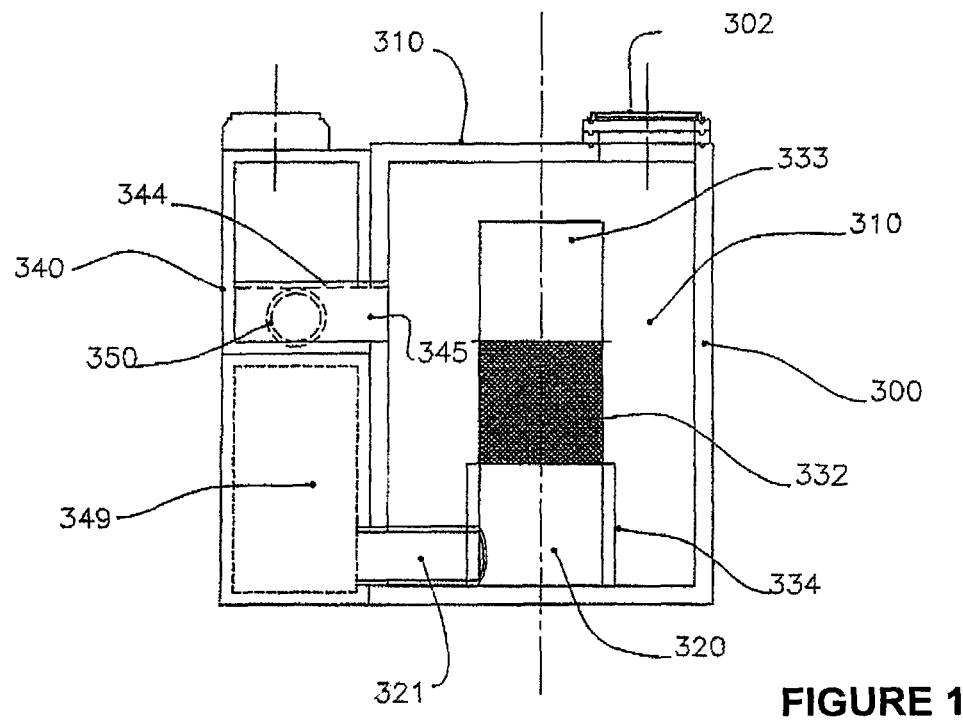
FIG. 1 is a vertical axial cross-section.
Figure 2:
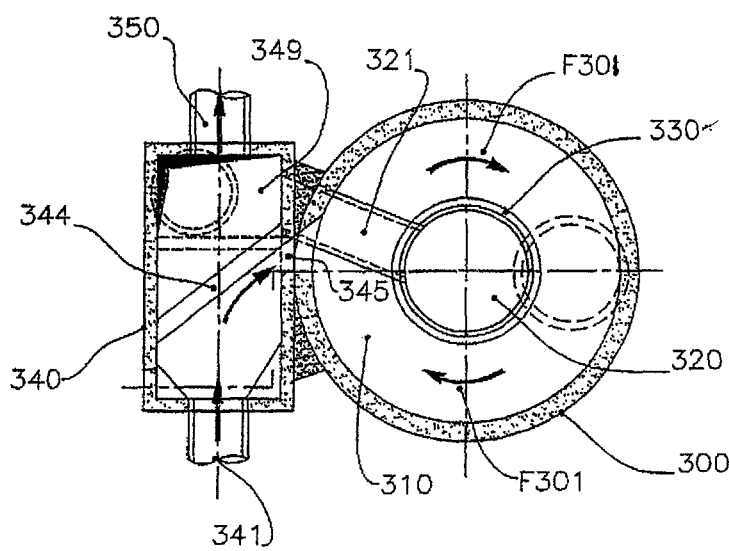
FIG. 2 is a horizontal cross-section showing the hydrodynamic separator described in EP 2,181,748.

Referring to FIG. 1, baffle 333 comprises a solid walled, hollow cylinder mounted on top of a primary screen cylinder 332, which can be an expanded, perforated, punched, slotted or otherwise made porous to provide a screen material. The elevation of the top of this cylinder is set so there is about 1 to 2-ft of freeboard above the expected water surface elevation of the flow over the bypass weir 344 that is in the separate diversion vault 340. The diversion weir structure shown in FIGS. 1 and 2 incorporates an overflow weir plate 344. Under normal flow conditions, this weir plate diverts flow into the tank 300. However in case of high flows, a portion of the flow passes over the overflow weir 344 and is directly discharged to the discharge chamber 349 and then to the effluent drain 350 without being filtered.

The separator consists of a hydrodynamic volume limited by a tank provided with an inlet for a waste containing influent stream and an outlet for the effluent stream with large particles removed.

To achieve the separation, the separator is divided into an inlet chamber and an outlet chamber, by a screen designed to retain large particles which accumulate in front of the screen or at the bottom of the separator. Clearing of the screen is achieved through the circulating movement of the effluent stream inside the separator. Cleaned effluents flow through the screen and are discharged at the outlet, without cluttering the screen.

The expanded, perforated, punched or slotted screen has a smooth metal separation surface of, for example, stainless steel with openings there through. The surface of the screen is installed vertically inside the tank.

The stream of effluent flowing along the separation surface induces a circular motion in the stream and waste of larger size, i.e. heavy solids is carried towards the center in a circular motion to descend to the bottom of the separator below the screen. Solid waste particles of smaller size than the apertures of the screen cylinder can also be captured along with the larger particles through swirl concentration, vortex separation and sedimentation.

Figure 6:
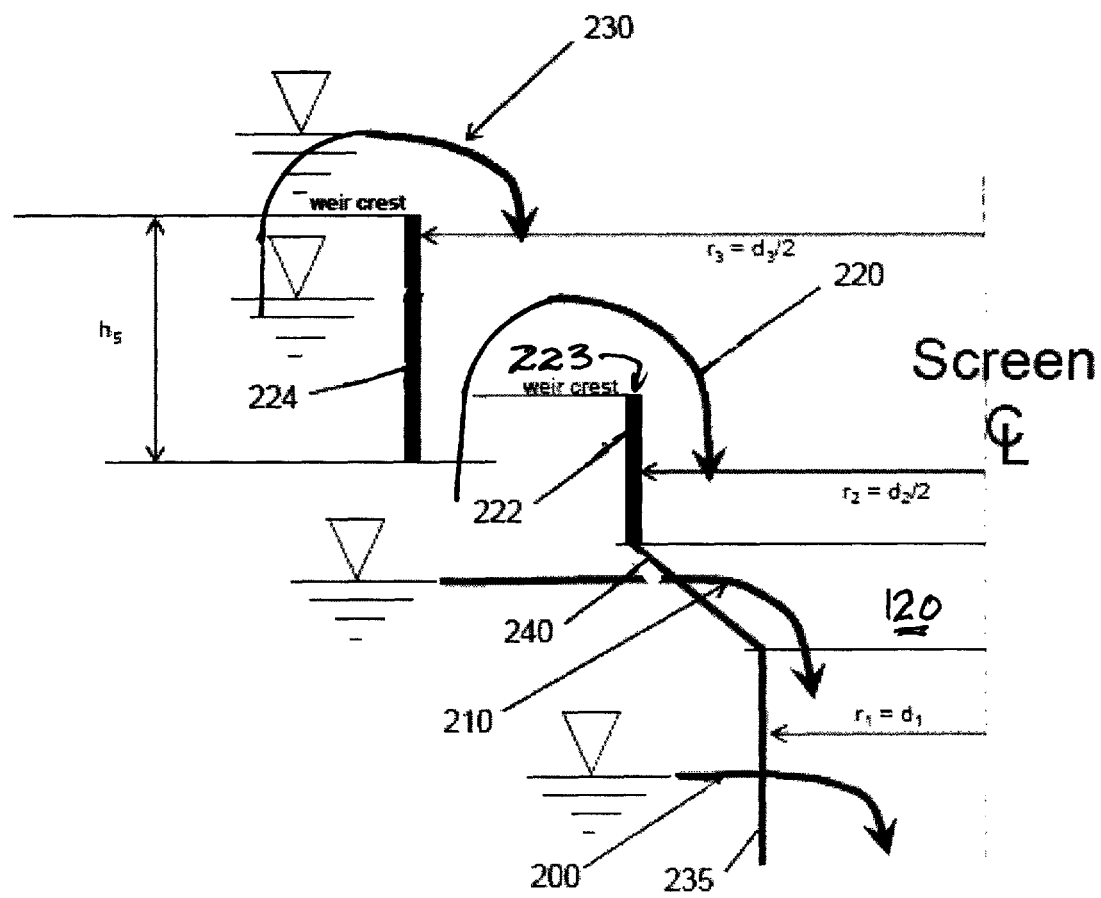
FIG. 6 is a schematic drawing showing the left side of the bypass system as shown in FIG. 4 and the flow paths of fluid during a high flow situation through that left side.
Figure 7:
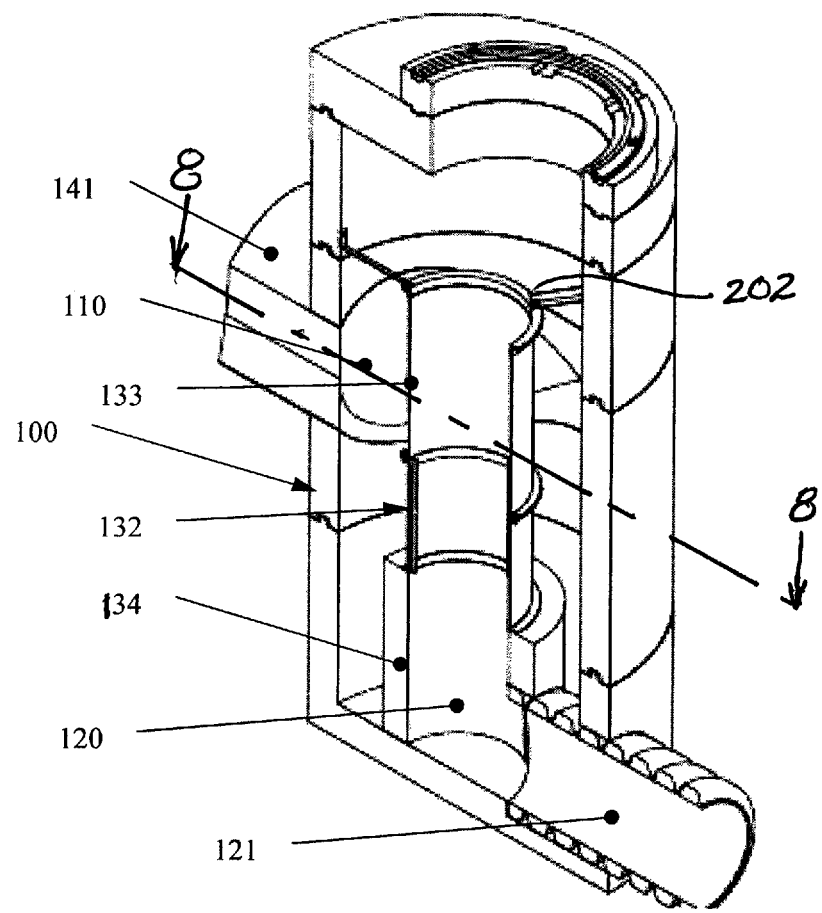
FIG. 7 is a vertical, cutaway perspective view of the separator of FIG. 3 prior to placement of the overflow structure.
Figure 8:
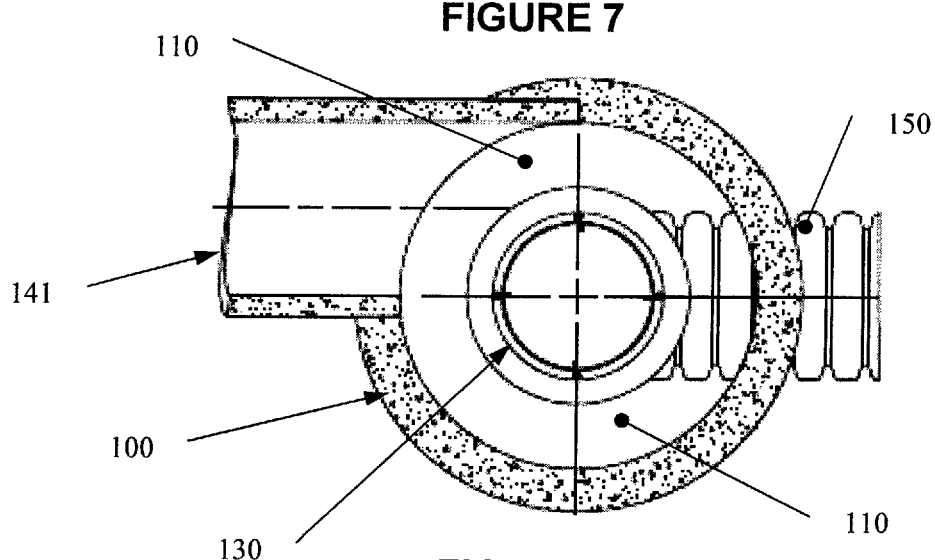
FIG. 8 is a top view of the separator taken along line 8-8 of FIG. 7.

FIGS. 7 and 8 show a hydrodynamic separator 10, similar to that shown in FIGS. 1 and 2, prior to inclusion of the upper extension 12 and incorporating features of the invention. A primary difference over FIGS. 1 and 2 of the hydrodynamic separator of FIGS. 7 and 8 is that the top of the solid walled cylindrical partition baffle 133 is configured for addition of the upper extension 12 (Quad Bypass Tower), shown in FIG. 3 and best shown in FIG. 4. The upper extension 12 allows large flows to bypass the separation/screening chamber, such as illustrated in FIG. 6, while still receiving screening and baffling treatment. In FIGS. 1 and 2, high flows will bypass over a weir 344 that is located in a separate structure upstream of the separator 10, and these bypass flows would receive no screening or baffling treatment. The Quad Bypass Tower 12 allows the hydrodynamic separator 10 to be placed directly in the pipeline alignment and directly in the flow path without the separate upstream weir structure that is required for proper operation of the prior art structure, which diverts high flow rates around the unit.

Large installations, such as municipal installations, require a separate structure for diversion of treatment flows. On the other hand, the Quad Bypass Tower 12 is appropriate for installation in areas with moderate to small flow and with defined size drainage areas. The Bypass Tower 12 allows such an installation to accommodate the projected flows from a 25, 50 or 100-yr storm event.

Referring to FIGS. 1, 2, 7 and 8 the separator consists of a cylindrical treatment tank 300, 100 of circular cross section having a partition baffle 330, 130 of cylindrical shape centrally mounted within the volume of the treatment tank 300, 100. The partition baffles 330, 130 comprise a solid walled lower portion 334, 134, a separation screen 332, 132 of a cylindrical shape on top of the lower portion, and a solid walled cylindrical partition baffle 333, 133 on top of the separation screen 332, 132 enclosing an inner channel 320, 120.

The assembly that is formed by the lower part 334, 134, the screen 332, 132, and the upper part 333, 133 subdivides the treatment tank 300, 100 into an external inlet chamber 310, 110, to receive loaded effluents, and an internal outlet chamber 320, 120, from which cleaned effluents are discharged. The internal chamber 320, 120 is connected to the effluent drain through a pipe 321, 121 which opens from the bottom of internal chamber 320, 120. The effluent drain pipe 321, 121 also functions as an outlet siphon minimizing the sedimentation of very fine, suspended particles in the filtered liquids that flowed through the screen 332, 132 from accumulating in this portion of the flow path.

The pipe 321, 121 opens to the bottom part of a discharge chamber 349, which is located below the input channel 341, 141 through which flow is fed into the treatment tank 300, 100. The influent stream containing waste material flows successively through the influent drain 341, 141 to the diversion weir box 340, then tangentially to the tank 300, 100 as indicated by the arrows in FIG. 2. The influent stream then flows in a swirl inside the external chamber 310, 110 following the rotational direction indicated by the two arrows F301. As a result of the rotational flow, the waste in the influent stream is washed from the outer surface of screen 332, 132. This allows the cleaned effluent to flow through the screen, leaving the macro-waste in the peripheral space outside the surface of the cylindrical screen, and the cleaned effluent subsequently drains through the internal chamber 320, 120, and is discharge through the effluent drain 321, 121.

The hydrodynamic separator is typically from about 0.3 to about 10 meters in diameter and from about 0.6 to 15 meters in height, respectively. The access hole 302 on the lid 301 of tank 300 provides access into the external cell 310, and also to the exterior of screen 332.

In the previous designs, such as in U.S. patent U.S. Pat. No. 6,241,881, the loaded influent stream flows to a space enclosed by the screen and is filtered by passing outward through the screen so that the removed solid material tends to fill the space interior of the cylindrical screen. In the current separator, the feed stream is fed to the outside of the screen and flow is around the outer surface of the screen with the inflowing stream passing through the screen to provide a filtered stream exiting from the space within the cylindrical screen.

Figure 3:
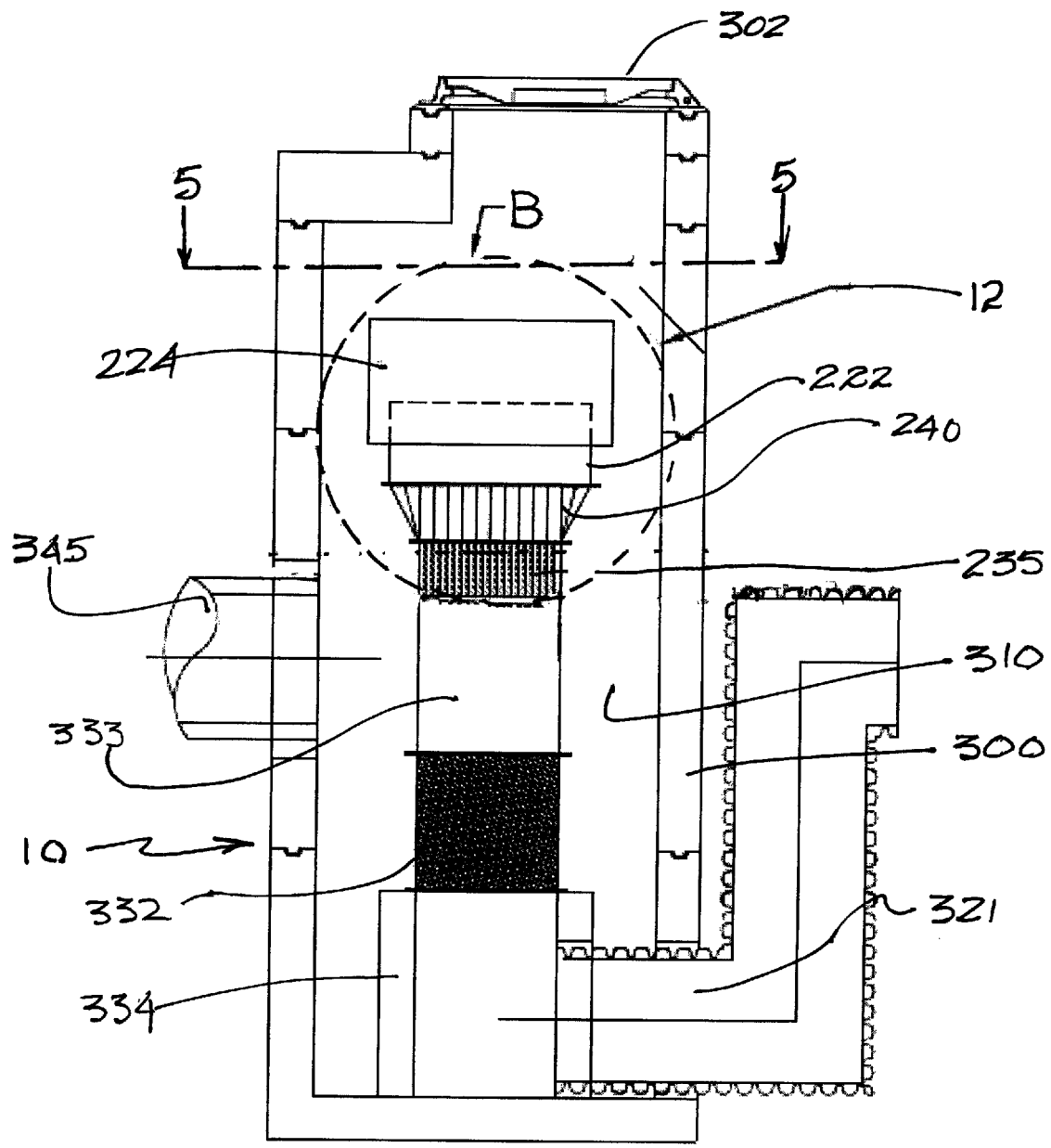
FIG. 3 is a vertical axial cutaway view of a separator incorporating features of the invention.
Figure 4:
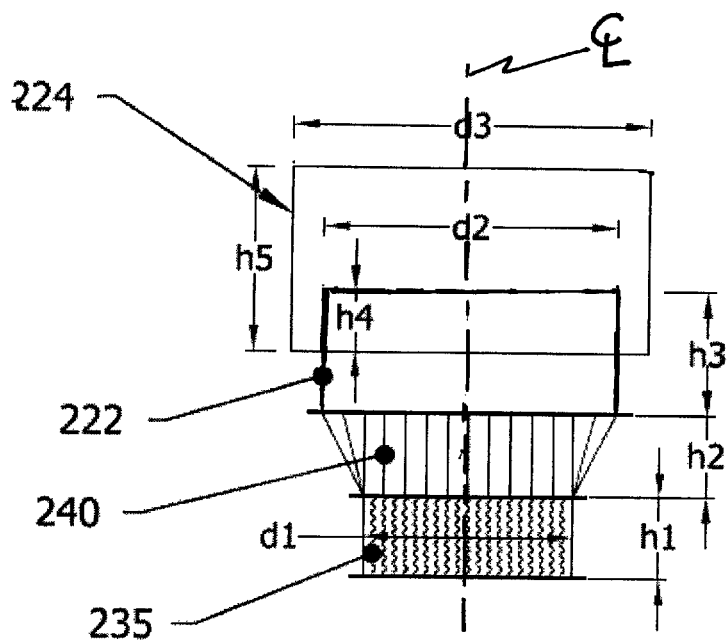
FIG. 4 is an enlarged view of the portion of FIG. 3 enclosed by circle B of FIG. 3.
Figure 5:
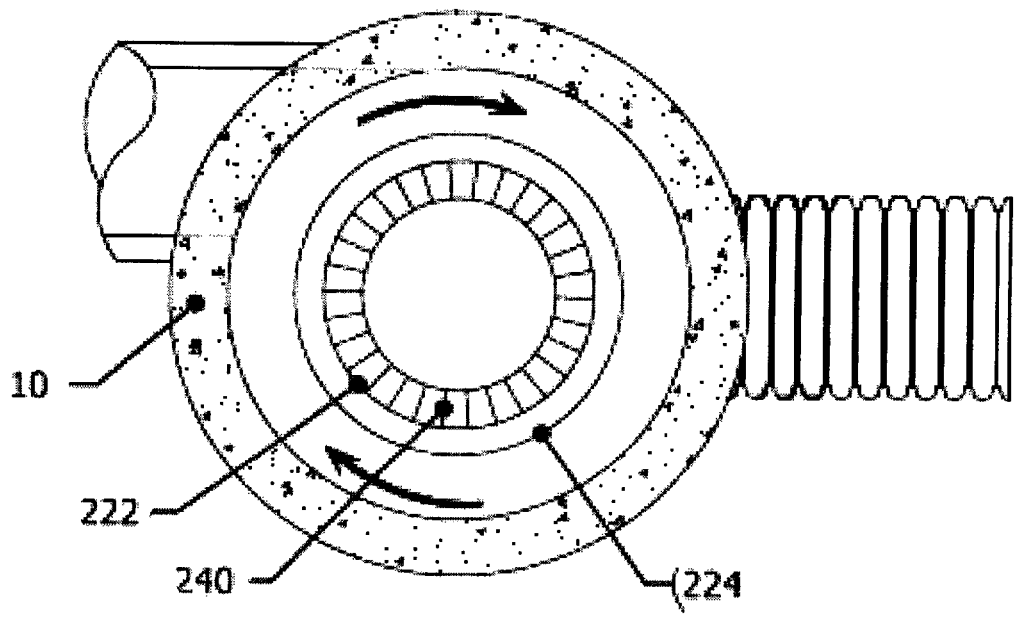
FIG. 5 is a top view of the separator taken along line 5-5 of FIG. 3.

Referring to FIGS. 3, 4 and 6, the following describes the screened, baffled and bypass flows in a unit that incorporates the Quad Bypass Tower exposed to high fluid flows. This enhancement enables the high fluid flows to bypass the main filter system while still being processed in a single manhole structure, making it more versatile than the currently available manhole units such as shown in FIGS. 1 and 2 or inside to outside flow separators such as shown in the prior art described above. The flows referred to below are best shown in the FIG. 6. The hydraulic conditions of the screened flow through the Quad Bypass Tower are such that clogging is minimized.

The Quad Bypass Tower in a preferred embodiment comprises a first filtering structure screen 235, preferably a metal screen, attached to a pedestal 202 on the top of the baffle 333. Above the first filtering structure is a second filtering structure 240, comprising, in a preferred embodiment, upwardly extending, spaced apart bars. In a further preferred embodiment these bars are arranged in a conical manner. Above the second filtering structure is a cylindrical vertical wall 222, the cylindrical wall 222 functioning as a first weir so that excess fluid input flows over the top thereof. A cylindrical hanging baffle 224 with a diameter greater than the diameter of the cylindrical vertical wall 222 extends both above and below the top of cylindrical vertical wall 222. The cylindrical hanging baffle 224 also functions as a weir with even greater excess input fluid flowing over the top thereof to accommodate extremely high bypass flow conditions. While the first filtering structure 235 and second filtering structure 240 are shown to be a metal screen and a bar screen, respectively, one skilled in the art will recognize that other alternative filtering structures can be utilized. The intent is to provide a filtering function to remove at least a portion of the waste material in an overflow situation while allowing the same or greater flow of a cleaned (i.e., less waste containing) stream through the filtering structures and into the centrally located outlet from the internal chamber 320, 120. For example, any combination of screens, meshes, bars or porous flow barriers can be used.

If a high flow situation occurs a first bypass flow 200 passes through the first filtering structure (a perforated, punched, slotted or expanded metal screen) 235 mounted on the pedestal 202. It functions as a non-blocking screen, like the primary separation screen 132 in the lower cylinder described above.

As flow increases a second bypass flow 210 passes through the second filtering structure (a bar screen) 240. The bar screen 240 can comprise vertically oriented spaced apart bars but in a preferred arrangement they are oriented, as shown in the figures, configured as a cone. The second bypass flow 210 is intended to handle the greater amount of fluid as influent flow rate increases. Because the bar screen has a tendency to cause waste material to be pinned against its surface, this pinning tendency is mitigated by placing the bars at an incline downward angle in a conical configuration. With this configuration the trapped material tends to slide downward off the bar surface.

As the flow further increases a third bypass flow 220, which is not screened, is allowed to spill over the top 223 of the cylindrical vertical wall 222 (functioning as a weir) and into the center of the internal chamber 120. However, some waste obstruction is provided by the cylindrical hanging baffle 224 which retains floatables and also functions as another weir.

If very high flows are encountered bypass flow 230 occurs. The flow proceeds unfiltered upward external of, and then over, the top of the cylindrical hanging baffle 224 and into the internal chamber 120. Under this flow condition, the first, second and third bypass flows 200, 210, 220 are at maximum flow and all the flow goes into the center of the internal chamber 120.

The separator 10 may also be configured to include a discharge pipe (not shown) through the wall of the unit with its inlet positioned at an elevation equal to the top of the hanging baffle. The inclusion of this additional discharge pipe is dictated by hydraulic conditions and is intended to discharge fluid only in the most severe flow conditions which are far in excess of the normal design capacity of the separator 10.

The various components of the system are sized in relationship to each other to have an acceptable flow through the system without any internal flow obstruction. Referring to FIG. 4 (not drawn to be dimensionally accurate but to readily illustrate the features), the dimensions below are provided as examples of a first embodiment with a 24" internal diameter inlet pipe, and are not intended as limitations on the scope of the disclosure.

Referring to FIG. 6:

| | |
|---|---|
| $d_0$ = diameter ($\Phi$) of Inlet Pipe 345, | 24 in |
| $d_1$ = diameter ($\Phi$) of screen cylinder 235, | 20 in |
| $d_2$ = top diameter ($\Phi$) of bar screen cylinder 240, | 28 in. |
| $d_3$ = diameter ($\Phi$) of cylindrical hanging baffle 224, | 34 in. |
| $h_1$ = Height of screen cylinder 235, | 8 in |
| $h_2$ = Height of bar screen cylinder 240, | 8 in |
| $h_3$ = Height of cylindrical vertical wall 222, | 20 in |
| $h_4$ = Plunge depth of cylindrical vertical wall 222 | 20 in |
| $h_5$ = Height of hanging baffle cylinder 224 | 20 in |
| Open area of perforated, punched, slotted or expanded Screen ($\alpha$) | 0.33%, |
| Open area of Conical Bar Screen ($\beta$) | 0.5%, |
| First Bypass Flowrate 200, (Q) | 10.15 ft$^3$/s |

Circumferential Weir Length of cylindrical Overflow Weir 222, (L=$\pi \cdot d_2$) 7.33-ft, q=1.385(ft3/s)/ft,=Q/L, (Unit Weir Flow)

$D_c$=0.390-ft, $(q^2/g)^{1/3}$ (Critical Depth at Circular Overflow Weir)=4.7-in $H_m$=0.586-ft, 3/2·$D_c$, Minimum Hydraulic Head above Circular Weir=7.0-in One skilled in the art, based on the teachings herein can readily adjust these dimensions based on greater or lesser normal flow conditions and excess flows as may be projected for a 25, 50 and 100 year storm event and typify one possible set of dimensions for the Quad Bypass system.

One skilled in the art will recognize that the disclosure set forth herein is not limited to the specific embodiments shown or described herein. It should be further recognized that the bypass system described herein is not limited to outside-to-inside flow hydrodynamic separators but can be readily adapted for addition to the inside-to-outside flow structures shown in the prior art, for example as described above.

I claim:

1. An improved system for separating waste materials from a flowing stream of surface water, said system comprising a vertical cylindrical vessel and a vertical cylindrical structure located within and spaced from an inner wall of the cylindrical vessel, said system sized to accommodate a projected normal fluid flow and configured so that the flowing stream containing waste material entering the vessel
   a. flows into a peripheral space between the inner wall of the cylindrical vessel and the cylindrical structure locate therein,
   b. the flowing stream passes through a perforated wall portion of the cylindrical structure, and
   c. exits through and effluent pipe located at a lower portion of a central space enclosed within the cylindrical structure, the improvement comprising an overflow structure mounted within the cylindrical vessel and on a top portion of the cylindrical structure, said over flow structure comprising a combination of two or more upwardly extending filtering structures and two or more weirs sized to receive flow in excess of the projected normal fluid flow and filter at least a portion of the waste material from said excess flow and to direct such excess flow to the effluent pipe wherein:

a. at a first increased flow rate in excess of the projected normal fluid flow, said increased amount of flow passes through a first overflow filtering structure,
b. at a second increased flow rate in excess of the first increased flow rate, said second increased amount of flow passes through a second overflow filtering structure,
c. at a third increased flow rate in excess of the second increased flow rate, said third increased amount of flow passes over a weir, and
d. at a fourth increased flow rate in excess of the third increased flow rate, said fourth increased amount of flow passes over a second weir, such that all of the flow of fluid in excess of the projected normal fluid flow entering the improved system passing through the overflow structure and exits said improved system through the effluent channel.

2. The improved system of claim 1 wherein the two or more upwardly extending filtering structures comprise filtering screens or spaced apart bar barriers.

3. The improved system of claim 2 wherein the two or more upwardly extending filtering structures comprise two filtering structures, the first filtering structure comprising a perforated metal screen and the second filtering structure comprising an open barrier of spaced apart bars.

4. The improved system of claim 3 wherein the first filtering structure comprises a vertically oriented cylindrical metal screen.

5. The improved system of claim 3 wherein the second filtering structure comprises an open barrier of spaced apart bars arranged in a conical configuration with a top diameter of the conical configuration being greater than a bottom diameter of the conical configuration.

6. The improved system of claim 1 wherein a first weir comprises a cylindrical barrier mounted to the top of the second overflow filtering structure.

7. The improved system of claim 1 wherein a second weir comprises a cylindrical barrier extending above and below the top of a first weir, the second weir having a diameter greater than the diameter of the first weir such that there are flow channels both external and internal of the second weir, said internal flow channel being exterior of the first weir.

8. A system for separating waste materials from a flowing stream of surface water, said system comprising a vertical cylindrical vessel and a vertical structure comprising stacked filtering elements and weirs located within and spaced from an inner wall of the cylindrical vessel, said system sized to accommodate a projected normal fluid flow condition as well as an increased projected fluid flow for an abnormally high surface water flow condition, said system configured so that the flowing stream containing waste material entering the vessel
a. flows into a peripheral space between the inner wall of the cylindrical vessel and the vertical structure located within the cylindrical vessel,
b. the flowing stream passes through a filtering wall portion of the vertical structure, and
c. exits through and effluent pipe located at a lower portion of a central space enclosed within the vertical structure, the system comprising a cylindrical structure within the cylindrical vessel designed to accommodate a projected normal flow and an overflow structure mounted within the cylindrical vessel and on a top portion of the cylindrical structure, said cylindrical structure comprising at least one vertical cylindrical filtering element and said over flow structure comprising a combination of one or more upwardly extending filtering structures and one or more weirs sized to receive flow in excess of the projected normal fluid flow and filter at least a portion of the waste material from said excess flow and to direct such excess flow to the effluent pipe wherein the overflow structure comprises
a. a first overflow filtering structure sized to filter a first increased flow rate in excess of the projected normal fluid flow,
b. a second overflow filtering structure sized to filter a second increased flow rate in excess of the first increased flow rate,
c. a first weir attached to the top of the second overflow filter structure, said first weir sized to accommodate a still further flow increase and provide access to the central space enclosed within the vertical structure by flow over a top of the first weir, and
d. a second weir extending above and below the top of the first weir, such that all of the flow of fluid in both projected normal and projected abnormal fluid flow enters the system and exits the system through the effluent channel with at least a portion of the waste material being filtered and baffled by the several filtering structures so as not to exit the structure through the effluent channel.

9. A system for separating waste materials from a flowing stream of surface water, said system comprising a vertical cylindrical vessel and a vertical structure comprising stacked filtering elements and weirs located within and spaced from an inner wall of the cylindrical vessel, said system sized to accommodate a projected normal fluid flow condition as well as an increased projected fluid flow for an abnormally high surface water flow condition, said system configured so that the flowing stream containing waste material entering the vessel
a. flows into a space within the inner wall of the cylindrical vessel and the vertical structure located within the cylindrical vessel,
b. the flowing stream passes through a filtering wall portion of the vertical structure, and
c. exits through and effluent pipe located at a lower portion of the cylindrical vessel, the system comprising a cylindrical structure within the cylindrical vessel designed to accommodate a projected normal flow and an overflow structure mounted within the cylindrical vessel and on a top portion of the cylindrical structure, said cylindrical structure comprising at least one vertical cylindrical filtering element and said over flow structure comprising a combination of one or more upwardly extending filtering structures and one or more weirs sized to receive flow in excess of the projected normal fluid flow and filter at least a portion of the waste material from said excess flow and to direct such excess flow to the effluent pipe wherein the overflow structure comprises
a. a first overflow filtering structure sized to filter a first increased flow rate in excess of the projected normal fluid flow,
b. a second overflow filtering structure sized to filter a second increased flow rate in excess of the first increased flow rate,
c. a first weir attached to the top of the second overflow filter structure, said first weir sized to accommodate a still further flow increase and provide access to the central space enclosed within the vertical structure by flow over a top of the first weir, and
d. a second weir extending above and below the top of the first weir, such that all of the flow of fluid in both projected normal and projected abnormal fluid flow enters the system and exits the system through the effluent channel with at least a portion of the waste material being filtered and baffled by the several filtering structures so as not to exit the structure through the effluent channel.

* * * * *